(12) United States Patent
Petersen et al.

(10) Patent No.: US 7,572,176 B2
(45) Date of Patent: Aug. 11, 2009

(54) OVERHEAD POULTRY CONVEYING AND COUNTING SYSTEM

(75) Inventors: James A. Petersen, Gainesville, GA (US); Brian Porter, Watson, OK (US); Robert Scott, Fort Smith, AR (US)

(73) Assignee: Bettcher Industries, Inc., Birmingham, OH (US)

( * ) Notice: Subject to any disclaimer, the term of this patent is extended or adjusted under 35 U.S.C. 154(b) by 311 days.

(21) Appl. No.: 11/152,486

(22) Filed: Jun. 14, 2005

(65) Prior Publication Data

US 2006/0003682 A1 Jan. 5, 2006

Related U.S. Application Data

(60) Provisional application No. 60/579,364, filed on Jun. 14, 2004.

(51) Int. Cl.
*A22C 21/00* (2006.01)
(52) U.S. Cl. .......................... 452/184; 452/177
(58) Field of Classification Search .......... 452/177–184
See application file for complete search history.

(56) References Cited

U.S. PATENT DOCUMENTS

| | | | | |
|---|---|---|---|---|
| 3,997,013 A * | 12/1976 | Brook | ........................ | 177/52 |
| 4,021,336 A * | 5/1977 | Brook et al. | ................ | 209/557 |
| 4,122,953 A * | 10/1978 | Brook | ........................ | 209/551 |
| 4,150,374 A * | 4/1979 | Brook | ........................ | 340/674 |
| 4,163,488 A * | 8/1979 | Brook | ........................ | 177/52 |
| 4,300,644 A * | 11/1981 | Meyn | ........................ | 177/145 |
| 4,610,361 A * | 9/1986 | Elliot | ........................ | 209/555 |
| 4,627,007 A * | 12/1986 | Muschany | .................. | 452/157 |
| 5,230,251 A * | 7/1993 | Brandt, Jr. | ............... | 73/861.72 |
| 5,646,398 A * | 7/1997 | Sieksmeier et al. | ...... | 250/223 R |
| 5,724,801 A * | 3/1998 | Kogiso et al. | ................. | 57/281 |
| 5,781,112 A * | 7/1998 | Shymko et al. | ............ | 340/10.3 |
| 5,983,837 A * | 11/1999 | Briggs et al. | ................. | 119/845 |
| 7,133,742 B2 * | 11/2006 | Cruysen et al. | ............. | 700/226 |
| 2003/0139130 A1* | 7/2003 | Steffler et al. | ............... | 452/149 |

FOREIGN PATENT DOCUMENTS

WO    WO 00/27212    *  5/2000

\* cited by examiner

*Primary Examiner*—David J Parsley
(74) *Attorney, Agent, or Firm*—Tarolli, Sundheim, Covell & Tummino LLP

(57) ABSTRACT

A system and method of counting poultry carcasses conveyed by an overhead shackle conveying system. Poultry carcasses are suspended from shackles of an overhead conveying system and moved along a path of travel defined by the overhead conveying system. The carcasses are directed to engage a force detecting device. The force detecting device generates a signal, such as an electrical signal, when the impacted by a carcass, a magnitude of the electrical signal is proportional to a force of impact of the carcass on the force detecting device. The electrical signal is transmitted to a counter. The counter analyzes the electrical signal and increments a carcass count each time a force in a carcass identifying range is measured.

23 Claims, 1 Drawing Sheet

OVERHEAD POULTRY CONVEYING AND COUNTING SYSTEM

CROSS-REFERENCE TO RELATED APPLICATION

This application claims priority from Provisional Application No. 60/579,364, filed on Jun. 14, 2004. Provisional Application No. 60/579,364 is incorporated in its entirety herein by reference.

FIELD OF THE INVENTION

The present invention is directed to a system for counting poultry conveyed by an overhead conveying system and, more particularly, a force detection counting system for counting poultry carcasses conveyed by an overhead conveying system.

BACKGROUND ART

Poultry processing plants typically use overhead shackle conveying systems to transfer poultry carcasses through different processing operations. Overhead shackle lines generally run at constant speeds. The overhead shackle lines are continuous loop conveying systems with shackles spaced on a constant pitch, that is, a constant distance apart. The poultry carcasses, which could be chicken, turkey or duck carcasses, are generally suspended from the conveying shackles. The carcasses may be suspended by both legs, by one leg, by both wings, by one wing, or the neck. During normal operation, the majority of the shackles are loaded with carcasses. However, some of the shackles are empty. Throughout the shackle conveying process, the carcasses (birds) are selectively unloaded or ejected from the shackles depending on their size or weight and/or the requirements of each processing step. In order to properly track the changing flow of poultry carcasses, poultry processors will attach bird counting photo sensors and shackle counting electrical photo sensors onto the overhead line at different points along the path of travel defined by the line.

The consistent counting of poultry carcasses on moving shackles continues to be a challenge for poultry processors. Conventional carcass and shackle counting systems generally use electrical photo sensors. One set of photo sensors is used for counting the shackles. A second set of photo sensors is used for counting the poultry carcasses. The photo sensors are mounted to the track and are used with an electronic control system. The use of photo sensors to count shackles has generally been a reliable process. However, the use of photo sensors to count poultry carcasses have been inaccurate due to bird swinging in front of a photo sensor when the line stops, varying bird sizes, improperly hung birds and sensor blockage.

What is needed is a system for conveying and counting poultry that provides for accurate counting of poultry carcasses at one or more points along a poultry conveying line. What is also needed is a system for conveying and counting poultry that provides a visual display of the poultry count at one or more points along the poultry conveying line. What is also needed is a system for conveying and counting poultry that discriminates between a true count of a poultry carcasses and a false carcass count caused by, for example, a poultry carcass swinging in the path of or against a sensor or counter.

SUMMARY OF THE INVENTION

The present invention is directed to a system for conveying and counting poultry carcasses. The system includes an overhead shackle conveyor, shackles, a force detecting device, and a carcass counter. The overhead shackle conveyor moves the shackles and poultry carcasses suspended by the shackles along a path of travel. The force detecting device is positioned to engage the poultry carcasses as the poultry carcasses are moved along the path of travel. The counter is coupled to the force detecting device. The counter adds one to a carcass count when a force in a carcass identifying range is imparted on the force detecting device.

In one aspect, the present invention features an overhead conveying and counting system for poultry carcasses including a moving conveyor line; a plurality of shackles spaced along and moving with the conveyor line, each of the plurality of shackles adapted to hold a poultry carcass; a carcass force detecting device for counting poultry carcasses positioned adjacent the conveyor line and including a plate adapted to be sequentially impacted by poultry carcasses held on the plurality of shackles, the force detecting device generating a signal when the plate is impacted by a poultry carcass; and a counter coupled to the carcass force detecting device and, upon receiving the signal indicative of a poultry carcass impacting the plate, incrementing a count of poultry carcasses.

In one preferred embodiment, the overhead conveying and counting system further includes a shackle detecting device positioned to sense shackles as the shackles are moved along the path of travel. The shackle detecting device sends a shackle count signal to the counter upon sensing a shackle and the counter increments a count of shackles upon receiving the shackle count signal.

These and other objects, advantages, and features of exemplary embodiments of the invention are described in detail in conjunction with the accompanying drawings.

BEST MODE FOR CARRYING OUT THE INVENTION

First Preferred Embodiment

Figure 1:
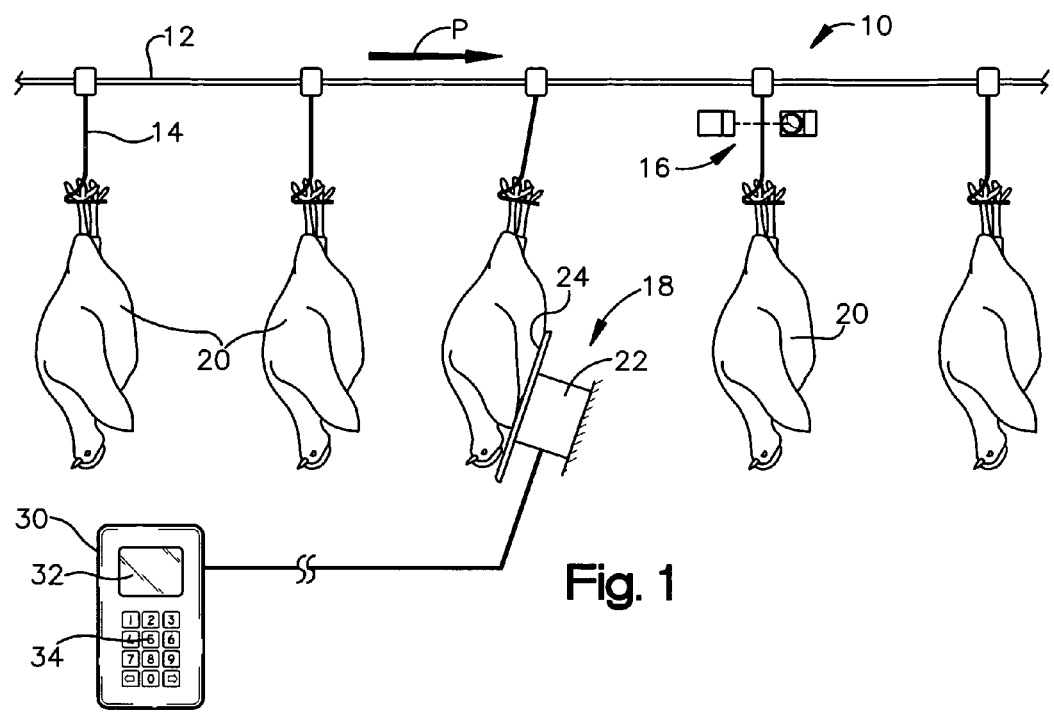
FIG. 1 is a schematic representation of a first embodiment of the overhead conveying and counting system of the present invention.

A first preferred embodiment of an overhead conveying and counting system of the present invention is shown generally at 10 in FIG. 1. The system 10 includes a line 12 of conveyed shackles 14, a shackle counting sensor 16, a carcass force detecting sensor device 18 and a counter 30.

The line 12 moves the shackles 14 and the suspended carcasses 20 along a path of travel P. The carcass force detecting device 18 is an electronic load cell 22 that supports a rigid force detection platform or plate 24. As each carcass 20 is moved along the path of travel P by the line 12, it is directed to glance off the plate 24. The load cell 22 includes one or more force sensors that sense a force of impact on the plate 24 and, via a transducer, generates a signal proportional to the magnitude of the impact force on the plate. In one preferred embodiment, counter control system 30 may include two load cells for redundancy in the event that one load cell fails during operation of the line 12.

The signals generated by the load cell 22 are transmitted to the counter 30. The load cell 22 may be an analog load cell or a digital load cell. Depending on the type of load cell employed and the data communication link utilized between the load cell and the counter 30, the output signal may be an electrical signal in the form of an AC or DC voltage impulse, a current impulse, a frequency change of a time varying output signal, or a digital numerical output. Alternately, the signal may be a pneumatic or hydraulic based signal. Since the shackles 14 swing or pivot with respect to the line 12, when the carcass 20 impacts the plate 24, the line 12 keeps moving at a predetermined velocity, the carcass slides off the plate 24 and swings forwardly in the direction of the path of travel P. It should be understood that although the load cell 22 and counter 30 are shown as separate components in the drawings, one of skill in the art would recognize that the counter 30 and load cell 22 could be an integrated unit, if desired.

In the embodiment illustrated in FIG. 1, the position and angle of the force detection plate 24 relative to the moving carcasses is adjustable. In the illustrated embodiment, the shackles 14 are counted by a conventional photo sensor 16. It should be readily apparent that a force detecting sensor or device could also be used to count the shackles 14.

In the embodiment illustrated in FIG. 1, the carcass force detecting device 18 is located in and perpendicular to the path of travel of the carcasses 20. Each time a carcass engages the carcass force detecting device 18, a bird or carcass count is generated and transmitted to the counter 30.

Second Preferred Embodiment

Figure 2:
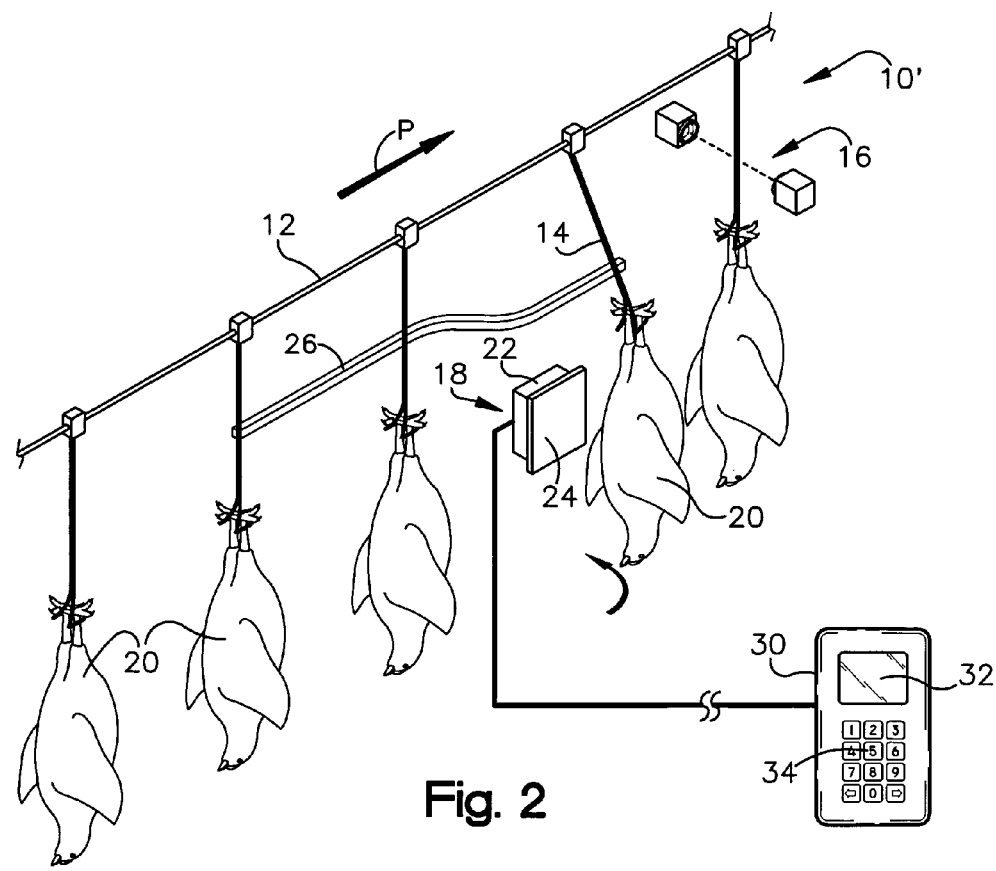
FIG. 2 is a schematic representation of a second embodiment of the overhead conveying and counting system of the present invention.

A second preferred embodiment of the overhead conveying and counting system 10' is shown schematically in FIG. 2. As with the first embodiment, the system 10' includes a line 12 of conveyed shackles 14, a shackle counting sensor 16 and a carcass force detecting sensor device 18.

In the alternate embodiment illustrated in FIG. 2, the shackles 14 and carcasses 20 are swung in a direction transverse to the path of travel P to engage the platform or plate 24. In the embodiment illustrated in FIG. 2, a guide bar 26 positioned upstream or ahead of the carcass force detecting device 18, lifts the shackle 14 and attached carcass 20 upwardly and then releases the shackle when the shackle sides off the end of the guide bar 26. Upon release of the shackle 14, the carcass 20 falls or swings and strikes the platform 24 of the carcass force detecting device 18. Since the line 12 keeps moving, after striking the platform 24, the carcass 20 slides off the plate 24 as the shackle 14 continues to move in the direction P. The load cell 22 generates a carcass count that is transmitted to the counter control system 30. In this embodiment, the plate 24 is generally parallel to the path of travel P.

Counter Control System 30

The counter control system 30 is electrically coupled the carcass force detecting device 18. When the device platform 24 is struck by a carcass 20, the load cell 22 generates a carcass count that is logged into, that is, transmitted to the counter 30. The carcass count is in the form of an electrical signal, typically an electrical analog or digital signal, generated by the load cell 22. For example, with an analog load cell, the signal may be in the form of a voltage impulse where a magnitude of the voltage impulse is proportional to a force with which the carcass impacts the plate 24. With a digital load cell, the signal generated by the load cell 22 will be a digital value which corresponds to an impact force of the carcass 20 on the plate 24. The counter 30 may include signal conditioning circuitry or software. Transmission of the electrical signals from the load cell 22 to the counter 30 may be via conventional electrical conductors or cables or via wireless transmission such as rf transmission.

The counter 30 includes a visual display 32 that displays and tracks shackle totals, displays and tracks total carcasses (birds), displays and tracks the shackle rate (shackles per minute), displays and tracks the bird rate (birds per minute), and tracks time periods when the line 12 is moving, but the shackles 14 are empty. The counter 30 may be in proximity to the carcass force detector sensor 18 or may be at a remote location. Additionally, the counter 30 may be dedicated to a single carcass force detector sensor 18 or may be programmed to received input from and display output of multiple carcass force detector sensors.

In one embodiment, a controller of the counter control system 30 electronically sends the counting data to other control devices. The counter control system 30 provides for a calibration mode which allows a user of the system 10 via input keys 34 to set up force detection minimums and maximums that represent the force of typical poultry carcasses impacting the platform 24 of the force detection device 18. That is, the counter 30 analyzes electrical signals generated by the load cell 22. An electrical signal that corresponds to a force within a predetermined carcass identifying range is assumed by the counter 30 to be carcass striking the platform 24 and, accordingly, the counter 30 increments a carcass count and displays the incremented carcass count.

The calibration mode also allows the input of the typical time period between each carcass. That is, how long it should take between sensor impacts if each shackle is loaded with a carcass and the line 12 is running at a predetermined speed. In the exemplary embodiment, the counter 30 is programmed to analyze the strike force applied to the force detecting device 18 and the time between impacts of the force detecting device 18.

The counter 30 of the system 10 advantageously distinguishes between a real carcass count and a false carcass count. For example, false carcass counts may be detected when the line 12 is moving and the carcass 20 bounces off the force plate 24 multiple times as it passes. The counter 30 looks at the forces of the impacts and the time between strikes and ignores the miscounts. For example, the counter 30 would ignore counts that occur in the time period between when the initial strike was detected and the time the next strike was expected to occur. A false count will be detected by the counter 30 when the line 12 comes to a stop or has stopped moving and a carcass 20 bounces off the plate 24 multiple times as the line comes to a stop with the carcass on the plate. The multiple impacts of the carcass force detecting device are ignored by the counter 30 when the line comes to a stop. Another false count can be attributed to the line 12 coming to a stop and the carcass comes to a stop on the plate and remains there. The counter 30 is programmed to ignore miscounts generated by this situation.

Depending on desired control parameters, the counter 30 may or may not be coupled to the shackle counting photo sensor 16 and utilize signals generated by the photo sensor regarding shackle count. In one embodiment, software of the counter 30 that manages the bird/carcass counting process and software of another control device that manages the shackle counting process are operated independently of one another. In another embodiment, the counter 30 is coupled to the photo sensor 16 and the control system software/circuitry utilizes the shackle count or counting rate to make decisions when analyzing for false counts. In this embodiment, the software and/or circuitry of the counter 30 that manages the bird/carcass counting process is dependent on or part of the software and/or circuitry that manages the shackle counting process.

In one embodiment, the counter 30 employs the following decision logic for incrementing the carcass count when an electrical signal is received from the carcass force detecting device 18 corresponding to an object impacting the plate 24:

1) Is the time elapsed since the last carcass count increment equal to or greater than a predetermined time? If so, proceed to 2. (The predetermined time corresponds to a minimum time between successive carcasses impacting the plate 24 when the line 12 is traveling at a predetermined desired line velocity v.)

2) Does the magnitude of the electrical signal currently received from the force detecting device 18 correspond to an impact force on the plate 24 within the carcass identifying range? If so, increment the carcass count by one.

If the counter 30 is also receiving input from the shackle counting photo sensor 16, the decision logic above may be modified as follows:

1) Is the time elapsed since the last carcass count increment equal to or greater than the predetermined time? If so, proceed to 2.

2) Has a shackle 14 been sensed within a predetermined time interval of receipt of the electrical signal of the force detecting sensor device 18? If so, proceed to 3. (This insures that a shackle 14 has been sensed approximately concurrently with the carcass impacting the plate 24. Since the photo sensor 15 may be positioned slightly upstream or downstream (as in FIG. 1) of the carcass force detecting sensor 18, a time interval based on the line speed or velocity must be provided because the electrical signals generated by the sensors 16, 18 will not be concurrent. For example, in the embodiment of FIG. 1, the signal generated by the photo sensor 16 sensing the shackle 14 will lag the signal generated by the force sensing device 18 sensing the impact of the carcass 20.

3) Does the magnitude of the electrical signal received correspond to an impact force on the plate 24 within the carcass identifying range? If so, increment the carcass count by one.

Although the present invention has been described with a degree of particularity, it is the intent that the invention include all modifications and alterations falling within the spirit or scope of the appended claims.

We claim:

1. A method of counting poultry carcasses conveyed by an overhead shackle conveying system, comprising:
   a) suspending poultry carcasses from shackles of an overhead conveying system;
   b) moving the poultry carcasses along a path of travel defined by the overhead conveying system;
   c) providing a guide bar positioned adjacent the overhead conveying system, the guide bar contacting and lifting the shackles to direct the poultry carcasses to engage a force detecting device comprising a plate affixed to a force sensing load cell, the guide bar at least partially positioned upstream of the force detecting device along the path of travel, a section of the guide bar adjacent the load cell positioned to contact the shackles and lift the shackles and suspended poultry carcasses, the load cell generating a signal when the plate is impacted by a poultry carcass, the signal being proportional to a magnitude of an impact force on the plate; and
   d) adding one to a carcass count each time a signal corresponding to an impact force in a carcass identifying range is measured.

2. The method of claim 1 wherein the force detecting device is in the path of travel defined by the overhead conveying system.

3. The method of claim 1 further comprising swinging the shackles in a direction transverse to the path of travel to engage the force detecting device.

4. The method of claim 1 further comprising using predetermined minimum and maximum impact force values and a minimum time between engagement value to detect false carcass counts.

5. The method of claim 1 further comprising counting the shackles moved by the overhead shackle conveying system.

6. A system for conveying and counting poultry carcasses, comprising:
   a) an overhead shackle conveyor for moving the poultry carcasses along a path of travel;
   b) a plurality of shackles suspended by the overhead shackle conveyor for carrying poultry carcasses;
   c) a force detecting device positioned to engage the poultry carcasses as the poultry carcasses are moved along the path of travel, the force detecting device comprising a plate affixed to a force sensing load cell, the load cell generating the signal when the plate is impacted by a poultry carcass, the signal being proportional to a magnitude of an impact force on the plate;
   d) a stationary guide bar positioned adjacent the conveyor, the guide bar contacting and lifting the plurality of shackles to direct the poultry carcasses to engage the plate of the force detecting device, the guide bar at least partially positioned upstream of the force detecting device along the path of travel, a section of the guide bar adjacent the load cell position being positioned transverse to the path of travel to contact the plurality of shackles and lift the plurality of shackles and associated poultry carcasses; and
   e) a counter coupled to the force detecting device that adds one to a carcass count when a signal corresponding to an impact force in a carcass identifying range is imparted on the plate of the force detecting device.

7. The system of claim 6 wherein the force detecting device is in the path of travel defined by the overhead conveying system.

8. The system of claim 6 wherein the guide bar swings the shackles in a direction transverse to the path of travel to engage the force detecting device.

9. The system of claim 6 further comprising a controller programmed with predetermined minimum and maximum impact force values and a minimum time between engagement value that used by the controller to detect false carcass counts.

10. The system of claim 6 further comprising a shackle detecting device positioned to sense shackles as the shackles are moved along the path of travel.

11. The system of claim 10 wherein the shackle detecting device is a photo sensor.

12. An overhead conveying and counting system for poultry carcasses comprising:
   a) a moving conveyor line;
   b) a plurality of shackles spaced along and moving with the conveyor line, each of the plurality of shackles adapted to hold a poultry carcass;

c) a carcass force detecting device for counting poultry carcasses positioned adjacent the conveyor line and including a plate adapted to be sequentially impacted by poultry carcasses held on the plurality of shackles, the force detecting device including a load cell coupled to the plate, the load cell generating a signal when the plate is impacted by a poultry carcass, the signal being proportional to a magnitude of an impact force on the plate;

d) a stationary guide bar positioned adjacent the conveyor line, the guide bar contacting and lifting the plurality of shackles to direct the poultry carcasses to engage the plate of the force detecting device, the guide bar at least partially positioned upstream of the force detecting device along the path of travel, a section of the guide bar adjacent the load cell position being positioned transverse to the path of travel to contact the plurality of shackles and lift the plurality of shackles and associated poultry carcasses; and e) a counter coupled to the carcass force detecting device and, upon receiving the signal corresponding to an impact force indicative of a poultry carcass impacting the plate, incrementing a count of poultry carcasses.

13. The overhead conveying and counting system of claim 12 further comprising a shackle detecting device positioned to sense shackles as the shackles are moved along the path of travel.

14. The overhead conveying and counting system of claim 12 wherein the plate is positioned transverse to a path of travel of the conveyor line such that the poultry carcasses impact the plate as they move with the conveyor line.

15. The overhead conveying and counting system of claim 12 wherein the plate is positioned substantially parallel to a path of travel of the conveyor line and the guide bar is positioned adjacent the line and upstream of the plate to raise each shackle of the plurality of shackles when the shackle contacts the guide bar, the shackle then falling from the guide bar such that the poultry carcass held on the shackle impacts the plate.

16. The overhead conveying and counting system of claim 12 wherein a carcass identifying force range is input to the counter, the counter incrementing the count of poultry carcasses only if a signal received from the carcass force detecting device corresponds to a value within the carcass force range.

17. The overhead conveying and counting system of claim 16 wherein the counter monitors an elapsed time since a previous increment of the count of poultry carcasses, the counter incrementing the count of poultry carcasses only if a signal received from the carcass force detecting device corresponds to a value within the carcass force range and the elapsed time equals or exceeds a predetermined time.

18. The overhead conveying and counting system of claim 17 further including a shackle counting sensor positioned adjacent the conveyor line generating a signal when a shackle passes the shackle counting sensor, the counter incrementing the count of poultry carcasses only if a signal received from the carcass force detecting device corresponds to a value within the carcass force range and the elapsed time equals or exceeds a predetermined time and a shackle has been sensed within a predetermined time interval of the signal received from the carcass force detecting device.

19. The overhead conveying and counting system of claim 12 wherein the counter is physically remote from the carcass force detecting device.

20. The overhead conveying and counting system of claim 12 wherein the counter includes a visual display showing a count of poultry carcasses.

21. The overhead conveying and counting system of claim 12 wherein the signal produced by the force detecting device is an electrical signal.

22. The overhead conveying and counting system of claim 21 wherein the electrical signal is a voltage signal.

23. The overhead conveying and counting system of claim 13 wherein the carcass force detecting device comprises the plate affixed to a pair of force sensing load cells.

\* \* \* \* \*